SILICON RECTIFIERS

Filed March 23, 1954

INVENTOR
CLARENCE G. THORNTON
BY Paul S. Martin
ATTORNEY

United States Patent Office 2,891,203

Patented June 16, 1959

2,891,203

SILICON RECTIFIERS

Clarence G. Thornton, Winchester, Mass., assignor to Sylvania Electric Products Inc., a corporation of Massachusetts Application March 23, 1954, Serial No. 418,119

10 Claims. (Cl. 317—240)

Figure 1:
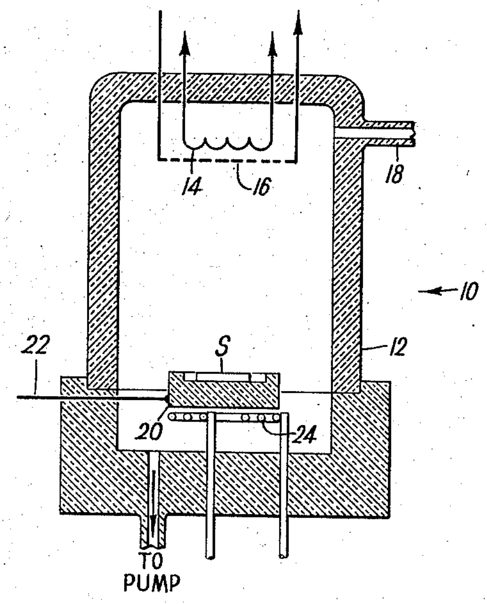

The present invention relates to semiconductor translators, particularly to devices having one or more rectifying connections to a body of crystalline semiconductive silicon, and novel methods of manufacturing such devices.

Silicon in highly purified state has been long recognized as a semiconductor, and for many years silicon has been used in making point-contact rectifiers. Commonly, such point-contact rectifiers have been made with a semiconductive body of P-type silicon in highly purified state to which is added a controlling impurity of the group III–B. A sharply pointed tungsten rectifying contact is engaged in pressure contact with a prepared surface of the silicon body. An area connection is formed on the opposite surface of the silicon body, as by electroplating. It has been a matter of extremely delicate and carefully conducted procedures to obtain desirable rectifying properties with such material and such connections. A series of meticulous surface treatments of the contact surface of the silicon is required, followed by placing the sharply-pointed contact in endwise pressure engagement with the treated surface. Thereafter, artfully applied mechanical shocks are used in completing the rectifier adjustment, while observing a cathode ray presentation of the rectifier characteristic such that desired electrical properties are attained.

Even though precautionary measures are followed during manufacture, there is still an objectionable amount of electrical shrinkage or loss, due in great part to the delicate procedures involved. The yield of good crystalline rectifiers in any production run is relatively low, and at a comparatively high unit cost. Most significantly, such rectifiers have been characteristically of low peak-back voltage (as compared to point-contact germanium rectifiers), and comparatively high inverse saturation current.

It is an object of the present invention to provide an improved method of processing semiconductor devices, particularly point-contact rectifiers employing silicon as the semiconductive material. Within the contemplation of the present invention is improvement in yield during manufacture of silicon rectifiers, and attendant reduction in unit cost.

It is a further object of the present invention to provide silicon rectifiers having generally improved characteristics, prominently high peak back voltage. Further improvement in characteristics are realized, particularly in respect to reduced capacitance, rapid recovery time, and reduced leakage or reverse saturation current. Additionally, high peak-back voltage rectifiers of the point-contact type are made available that are operable at temperatures much higher than the upper limit for like germanium rectifiers.

It is known that the electrical surface properties of silicon may be modified by bombardment with ions of inert gases, such as hydrogen, helium, nitrogen and argon. In an article appearing in the Bell System Technical Journal of January, 1952, entitled "Properties of Ionic Bombarded Silicon" by Russell S. Ohl, there is described a bombardment process in which a silicon surface is exposed to ions accelerated by energies in the range of 100 electron-volts to 30 kilo-electron-volts, in the presence of an inert or reducing gas of the aforesaid group. This reported bombardment was effected with the silicon at temperatures between 20° C. and 400° C., and experimental data given considering a number of variables including bombarding voltage, target temperature, time of exposure, and the impurity content of the base material. It was stated generally that it was possible to obtain semiconductive characteristics useful in fabricating of signal rectifiers and photo diodes, and that the effect of ion bombardment was to alter and improve electrical properties of the silicon for the mentioned applications. The results of the experiments indicate that electrical properties of the silicon may be pronouncedly changed upon bombardment with the aforementioned gases which are inert or reducing with the careful exclusion of foreign atmospheres, helium being the preferred bombarding medium. Precautions were taken to avoid the contaminating presence of impurity gases in the bombarding gas, as by carefully evacuating and hermetically sealing the treatment chamber.

The present invention relates to a markedly different process and is characterized by the ionic bombardment occurring in an oxidizing atmosphere. Air has been found to produce some improvement in the rectifying characteristics of the silicon, with pronounced improvement when using oxygen as the bombarding medium. Oxygen ion bombardment of silicon resulted in general improvement in the electrical properties and characteristics for incorporation in point-contact rectifiers or diodes, especially in attaining reduced reverse saturation current and greatly increased peak back voltages. Silicon junction rectifiers are also improved.

Figure 2:
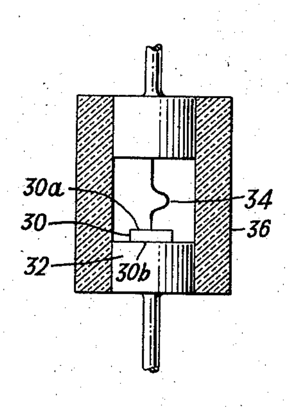

The above, as well as further objects, features and advantages of the present invention will become apparent upon reference to the following detailed description of a presently preferred process and the product obtained when taken in conjunction with the accompanying drawings, wherein:

Fig. 1 is a diagrammatic showing of an illustrative bombardment apparatus suitable for ionic treatment of semiconductors; and Fig. 2 is a diagrammatic showing of an improved point-contact rectifier embodying features of the present invention.

The form of silicon well suited to this process may be taken from a melt containing an appropriate impurity effective to impart the desired conductivity type, and in an amount appropriate to obtain a desired resistivity. Low resistivity as 0.5 ohm-centimeter is desirable for high forward current; but high resistivity silicon may also be used. This material may be converted to a single crystal by a well known crystal pulling technique, or a single crystal may be grown with a seed crystal and through carefully arranged directional cooling. This crystal is then cut into slices, and slices are polished and optionally etched in the manner conventional with the well known low peak-back voltage silicon rectifiers. Polycrystalline silicon may also be used.

Referring now specifically to Fig. 1, there is shown an illustrative apparatus 10 for bombarding a silicon body or wafer S which is prepared as stated above. Briefly, the illustrative apparatus 10 includes an enclosed chamber or hood 12 including a tungsten cathode or the like 14. This cathode 14 is connected to a suitable external energy source. The electrons emitted from the tungsten cathode 14 are accelerated toward an interposed grid 16, maintained at a positive potential in relation to the cathode by an appropriate external source of potential. Adjacent the grid is an inlet 18 for admission of the bombarding atmosphere, preferably oxygen in the pure form. Ionization occurs due to impact of the electrons with the gas molecules in the region of the positively-biased grid 16.

The silicon specimen S to be bombarded is negatively biased with respect to the filament or cathode 14 by appropriate means, such as supporting the specimen on a graphite plate or bed 20 connected to a suitable source of biasing potential 22. The negative biasing potential on the specimen accelerates the axially-moving positively charged particles toward the target region.

Preferably the target is maintained at an elevated temperature by provision of a heating coil or the like 24 in heat exchange relation to the plate or support 20, appropriate provision being made for regulating the temperature at the specimen S externally of the apparatus. For example, the coil 24 may be electrically with a thermocouple adjacent thereto arranged for temperature measurement and control.

A presently preferred ionic specimen treatment in accordance with the present invention employs oxygen as the bombarding ion, with acceleration voltages of from a low value to 30 kilovolts and specimen temperatures not exceeding 300° C. Oxygen pressure of $10^{-3}$ millimeters of mercury is suitable, higher pressures often resulting in a glow discharge. The ionic current typically is 10 microamperes per square centimeter. A four inch space between the silicon and accelerating grid is suitable. When bombardment is carried out at temperatures in excess of 300° C., the effect of the bombardment attains its limit in a very short time. The rate of annealing is in equilibrium with the rate at which the bombardment effect is produced and in a sense cancels the effect of further ionic treatment. Temperatures of approximately 250° C. have been found excellent. At these temperatures, continued bombardment for one hour or longer produces improved rectifier characteristics. The ionically bombarded surface is found to have an extremely inert highly resistive layer.

These changes brought about in silicon bodies processed as aforesaid are utilized to advantage in fabricating rectifiers having improved electrical characteristics, prominently high inverse working voltage. However, with prolonged treatment the aforesaid improvement generally was found to be accompanied by an increased forward resistance of the rectifier, especially at low voltages. As a separate aspect of the invention, the increased forward resistance, which may be a disadvantage in certain applications, is overcome by using extremely heavy loading on the sharp whisker point, from approximately 100 to 500 grams and/or pulsing of the completed rectifier with a heavy current in the range of 30 to 150 milliamperes.

Referring now specifically to Fig. 2, there is shown an illustrative crystal rectifier processed in accordance with the present invention. One surface of the silicon body 30 is formed with an area contact **30*b*, as by electroplating an appropriate metal thereon. The opposite surface 30*a* is ionically bombarded and enhanced as described above, and is mounted on a metal plug 32. It is assembled in heavy pressure engagement with tungsten whisker element 34, and the assembly is sealed in an envelope 36**. The contact pressure may be adjusted in accordance with techniques which are well understood and in general the processing is known, except for the oxygen-ion treatment detailed herein. Furthermore, a substantially heavier whisker wire is used for developing the desirable whisker pressure. A tungsten pointed whisker of .010 inch diameter has been found suitable.

It may be found advantageous to mount the crystal of silicon 30 on its support 32 and conduct the ionic bombardment treatment thereafter, so as to minimize exposure of the treated surface to contamination and damage during further handling and mounting operations.

Typical characteristics of the improved rectifiers include inverse operating voltages of 70 to 200 volts, an inverse saturation current of approximately one microampere, a capacitance of less than 0.3 micro-microfarads (in which the package represents a substantial contribution), and rapid recovery time. Forward current at 2 volts in excess of 2 milliamperes is readily attained. These characteristics can be varied depending upon the resistivity of the silicon used initially. With low resistivity silicon, lower forward resistance is obtained; yet high inverse working voltage can still be realized by prolonged bombardment with oxygen ions.

Marked photoeffects are obtained with the novel process and devices. In broad aspect, the point contact may be replaced by an area or an alloyed junction and the completed junction rectifier may to advantage be bombarded with oxygen ions to reduce inverse currents and to form an inert, protective surface in the region of the junction. The bombarded units show improvement in stability and remarkable immunity to effects of humidity and residual contaminants.

From the foregoing disclosure of an illustrative process and embodiment of the invention, those skilled in the art will readily find varying applications of the invention and various further modifications thereof will be readily apparent. Accordingly, the appended claims should be interpreted broadly, consistent with the spirit and scope of the invention.

What is claimed is:

1. A semiconductor device comprising a body of silicon having a prepared surface treated by bombardment with oxygen ions while being heated and while at a pressure below atmospheric pressure, a point-contact element engaging said prepared surface in a contact region, and means defining an envelope about said contact region.

2. In a point-contact rectifier including a semiconductor body having a contact surface and a sharp contact engaging said surface, the improvement comprising a silicon contact surface treated by ionic bombardment in an oxygen atmosphere while being heated at a temperature not in excess of 300° C.

3. A semiconductor device comprising a body of silicon having an oxidized, ionically bombarded contact surface, a sharp contact engaging said surface, and means establishing pressure of said contact against said surface from a 100 to 500 gram load.

4. In the preparation of a point-contact rectifier including a body of silicon and a whisker contacting a surface of said body of silicon, the steps including heating said body of silicon to a temperature of the order of 250° C., and bombarding said surface with oxygen ions.

5. The process of making diodes including the steps of heating a body of silicon to a temperature not exceeding 300° C. while at a pressure below atmospheric pressure, bombarding a surface of said body with oxygen ions, engaging said bombarded surface with a sharp contact, and enclosing the assembly of said body of silicon and said contact.

6. In the preparation of a point-contact rectifier including a body of silicon and a whisker contacting a surface of said body of silicon, the steps including heating said body of silicon to a temperature of the order of 250° C., bombarding said surface with ions in an oxidizing atmosphere, and electrically pulsing said rectifier.

7. The process of preparing rectifying devices including the steps of bombarding a surface of a body of silicon with oxygen ions, and engaging said surface with a sharp contact element at a contact pressure of 100 to 500 grams effective to minimize the forward resistance of the diode.

8. The process of making diodes, including the steps of bombarding a surface of a body of silicon in an oxygen atmosphere at a pressure of the order of $10^{-3}$ mm. of mercury at about 250° C. for about one hour.

9. The process of making diodes, including the steps of bombarding a surface of a body of silicon in an oxygen atmosphere at a pressure of the order of $10^{-3}$ mm. of mercury at about 250° C. for about one hour, and electrically pulsing said diode.

10. The process of making diodes, including the steps of bombarding a surface of a body of silicon in an oxygen atmosphere at a pressure of the order of $10^{-3}$ mm. of mercury at about 250° C. for about one hour, and assembling a sharp contact against the treated surface at a total pressure in excess of 100 grams.

References Cited in the file of this patent

UNITED STATES PATENTS

| | | |
|---|---|---|
| 2,441,603 | Storks et al. | May 18, 1948 |
| 2,462,218 | Olsen | Feb. 22, 1949 |
| 2,583,681 | Brittain | Jan. 29, 1952 |
| 2,750,544 | Pfann | June 12, 1956 |

OTHER REFERENCES

Bell System Technical Journal, vol. 31 (1952), pages 104–121. Article by Ohl.